May 24, 1927.                   E. PENBERTHY                   1,629,730
                        LUBRICATION OF PERCUSSIVE TOOLS
                            Filed Nov. 13, 1923
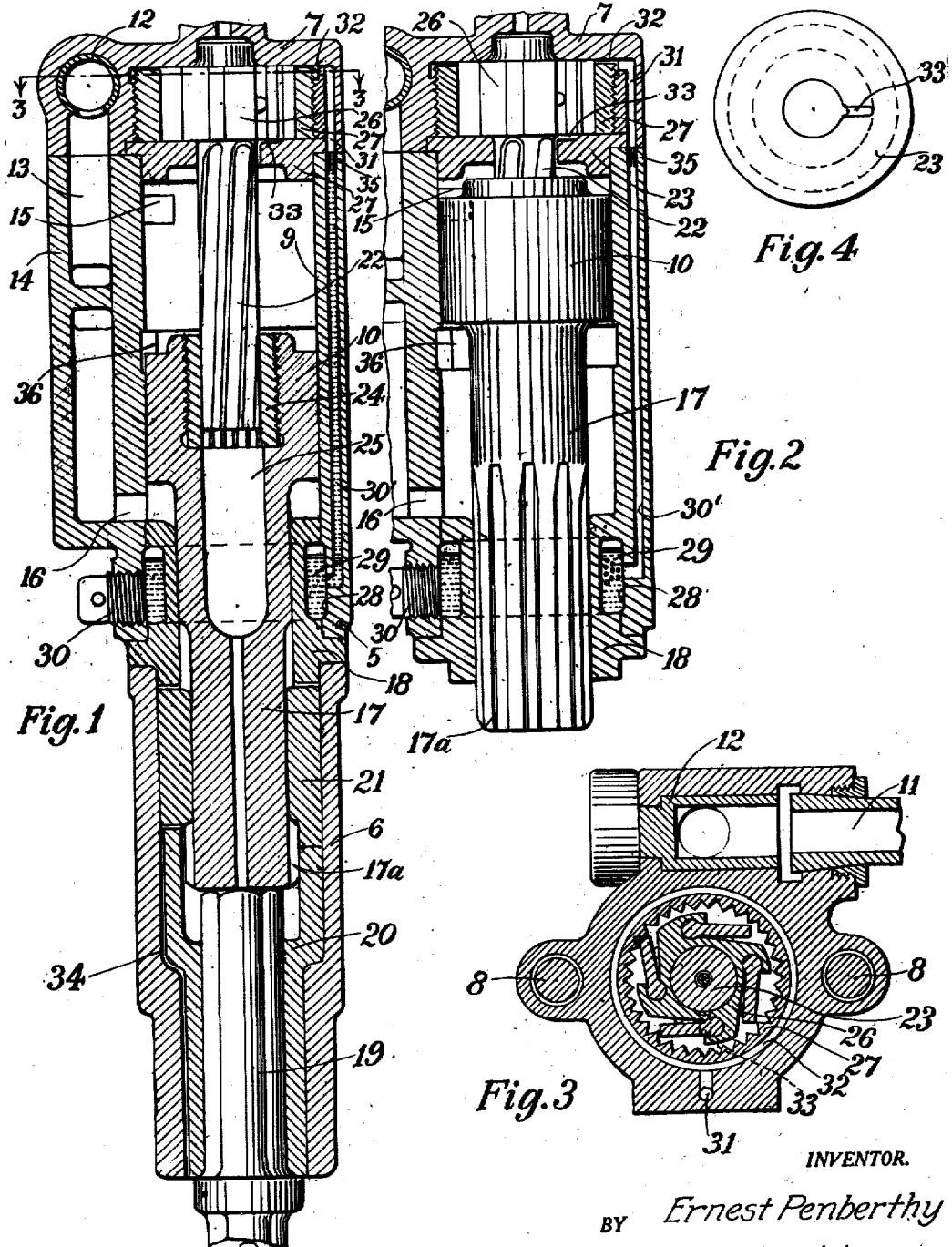
INVENTOR.
BY Ernest Penberthy
Ira L. Nickerson
his ATTORNEY.

Patented May 24, 1927.

1,629,730

UNITED STATES PATENT OFFICE.

ERNEST PENBERTHY, OF DETROIT, MICHIGAN, ASSIGNOR TO CHICAGO PNEUMATIC TOOL COMPANY, OF NEW YORK, N. Y., A CORPORATION OF NEW JERSEY.

LUBRICATION OF PERCUSSIVE TOOLS.

Application filed November 13, 1923. Serial No. 674,443.

This invention relates to improvements in percussive tools and particularly concerns the automatic application of lubricant to the working parts. In tools of this character, the matter of lubrication is of great importance due to the high speed at which such tools operate and the power developed thereby which is soon diverted from useful work to destructive heating and rapid wear of parts when internal friction develops.

Heretofore the method of lubrication generally employed has been gravity feed, frequently combined in the case of fluid pressure operated tools with eduction of lubricant caused by the passing of the motive fluid across or past the lubricant opening. In either case, during the operation of the tool, air under pressure works into the lubricant chamber augmenting the flow of lubricant and continuing to expel the same even after the operation of the tool ceases. This results in an excess of lubricant on the working parts which is not only wasteful but interferes with the proper functioning of the tool. Moreover, the resulting quick emptying of the lubricant chamber necessitates frequent inspection and attention to prevent the tool from being operated in a "dry" condition by a careless or indifferent workman until it jams or breaks down entirely. In view of the abuse to which tools of this character are frequently subjected, it follows that much of their unsatisfactory operation and high repair cost is directly traceable to improper lubrication.

Among the objects of the invention are to provide a lubricating system for tools of the character described which shall distribute the oil or other lubricant automatically in accordance with requirements and only while the tool is in operation, which shall function properly regardless of the angle at which the tool is supported, and in general to produce an efficient and positive distribution of the lubricant and to avoid the defects of previous systems.

In brief the invention comprises an automatic lubricating system for percussive tools adapted to operate in synchronism with the reciprocations of the percussive member to force lubricant against gravity to the working parts. In order to illustrate the invention, one embodiment thereof is shown in the accompanying drawings, in which:

Fig. 1 is a vertical longitudinal sectional view;

Fig. 2 is a fragmentary sectional view similar to Fig. 1, showing the impact piston in a different position;

Fig. 3 is a transverse sectional view on the line 3—3 of Fig. 1; and

Fig. 4 is a top plan view of the cylinder ring.

The embodiment of the invention chosen for the purpose of illustration comprises a percussive rock drill of the pneumatic type having a cylinder 5 provided with a front head 6 and a rear head 7 held in assembled relation in the usual manner as by side or through bolts 8 (Fig. 3). Within the piston chamber 9 of cylinder 5 the impact member or piston 10 reciprocates under the impulse of live air which enters the tool at 11 (Fig. 3) under the control of a hand throttle 12 by which it is admitted to a passage 13 (Fig. 1) which leads to an automatic distributing valve (not shown) mounted in a lateral extension 14 of cylinder 5 and arranged to admit the live motive fluid to the piston chamber alternately above and below piston 10 through ports 15 and 16 respectively. An extension 17 or piston 10 guided by the block or guide sleeve 18 reciprocates in the front head 6 and imparts blows to a working tool or drill bit 19 removably supported in chuck 20 rotatively mounted in the front head. Extension 17 has vertical ribs 17ª cooperating with grooves in a rotative sleeve 21 keyed to chuck 20 whereby rotation of the piston is imparted to the drill bit. In the form shown, the piston is rotated by the usual rifle bar mechanism comprising rifle bar 22 rotatively mounted in bearings in the back head 7 and cylinder ring 23 and cooperating with a rifle nut 24 secured in the central bore 25 of the piston, the bar having thereon a pawl carrier 26 which fits in a chamber in the back head and has pawls arranged for cooperation with a ratchet ring 27 in the head.

By reason of the high speed at which a percussive tool of this type operates, frequent and adequate lubrication is a necessity to prevent rapid wear. In the present instance such lubrication is effected automatically by the system now to be described. The chamber or reservoir for oil or other fluid lubricant may be in any suitable or desired position in the tool, provided that the outlet thereof is above the reservoir so that the lubricant must be forced against gravity. In the present instance the oil reservoir 28 is positioned in the guide sleeve 18 or between it and the cylinder wall, the same being arranged to be filled with oil 29 through an opening closed by a plug 30. A passage 30' leads from the reservoir upward through the wall of the cylinder 5 and is adapted to connect with a similar passage 31 in the back head 7, which passage has a cross port opening into an annular groove 32 in the rear of the head so that lubricant issuing from the passage is sprayed upon the parts of the rotation mechanism in the chamber of back head 7. This chamber is in communication with the piston chamber by a groove 33 in the cylinder ring 23 whereby the lubricant has access to the ribs of the rifle bar and to the walls of the piston chamber, this groove being intermittently covered and uncovered by the blades of the pawl carrier as the latter rotates when the drill is in operation (see Fig. 3). Thence the lubricant works downwardly by gravity, assisted by the variations in fluid pressure in the piston chamber, along extension 17 of the piston and into the front head, a groove 34 in the front head 6 or chuck 20 being provided, if necessary, to permit access of the lubricant to the bearing surfaces of these parts. At some point in the connecting passage between the reservoir and the piston chamber, the size of the passage is restricted, the amount of such restriction determining the flow of lubricant. While this restriction may be made in the passage at any suitable point and in any desired manner, for convenience and by preference, the same is effected by a perforated plug 35 inserted in the bore 30' at the rear end of cylinder 5.

The operation of the lubricating system is as follows: When the tool is in operation, the air pressure in the rear of the piston chamber varies due to the reciprocation of the impact member 10 and to the alternate admission and exhaust of fluid pressure through the intake port 15 and exhaust port 36, respectively. The lubricant 29 in the reservoir 28 is subjected to these pressure variations through the connecting passage which comprises groove 33 in the cylinder ring 23, the chamber in back head 7, the annular groove 32 and bore 31 therein, the restricted opening in plug 35 and bore 30' in the cylinder 5. Thus, when the piston 10 has moved rearwardly beyond the exhaust port 36, and during its forward stroke (Fig. 2) under the thrust of live fluid entering at 15, pressure fluid works into the connecting passage to the reservoir in limited amount through the restricted opening in plug 35. This pressure fluid at first mixing with the lubricant eventually separates out and is trapped in the upper part of the reservoir, as indicated by the space therein shown in Figs. 1 and 2, thus placing the lubricant in the reservoir under pressure. When the piston on its forward stroke passes beyond the exhaust port 36, to the position shown in Fig. 1, an immediate drop in pressure in the upper end of the piston chamber takes place, resulting in a spurt of lubricant from the passage 30—31 into the chamber in the back head 7 and upon the working parts therein, whence the lubricant works down through the tool in the manner above described, the rotation of the working parts serving to distribute the lubricant evenly and throwing a portion of it out against the walls of the cylinder 5 and front head 6, the amount of lubricant in each spurt being determined by the size of the opening in the plug 35. Thus it will be evident that the lubricant is forced against gravity and is then distributed evenly and in accordance with the requirements of the tool, the feed of the lubricant being intermittent, in synchronism with the movement of the impact member, and ceasing shortly after the stopping of the tool. While the invention has been disclosed as embodied in a pneumatic hammer drill, it is to be understood that the invention is not so limited but is capable of use with pneumatic tools generally and with percussive tools not actuated by motive fluid. In applying the system to different tools, the position of the lubricant reservoir may vary as well as the point of connection of the passage thereto in order that when the tool is held in any of its normal working positions the flow of lubricant to the working parts will be against gravity.

I claim:

1. In a percussive tool having a piston chamber and an impact piston reciprocable therein, a chamber in line with said piston chamber and connected thereto, a lubricant chamber disposed below said second named chamber in the normal position of the tool, and a continuously open passage leading from said lubricant chamber to said second named chamber whereby the lubricant is subjected to the varying pressure within said piston chamber and is forced against gravity through said passage into said second named chamber.

2. In a percussive tool having a piston chamber and an impact piston reciprocable therein, a chamber in line with said piston chamber, means intermittently connecting said chambers when the tool is in operation, a lubricant chamber disposed below said second named chamber in the normal position of the tool, and a continuously open passage leading from said lubricant chamber to said second named chamber whereby the lubricant is subjected to the varying pressure within said piston chamber and is forced against gravity through said passage into said second named chamber.

3. In a percussive tool having a piston chamber and an impact piston reciprocable therein, a chamber in line with said piston chamber and connected thereto, a lubricant chamber disposed below said second named chamber in the normal position of the tool, a continuously open passage leading from said lubricant chamber to said second named chamber whereby the lubricant is subjected to the varying pressure within said piston chamber and is forced against gravity through said passage into said second named chamber, and means for restricting the flow of fluid through said passage.

4. In a percussive tool having a piston chamber and an impact piston reciprocable therein, a chamber in line with said piston chamber, means intermittently establishing communication between said chambers, a lubricant chamber so disposed as to be beneath said second named chamber in the normal position of the tool, a continuously open passage leading from said lubricant chamber to said second named chamber, and means for restricting the flow of fluid through said passage.

5. In a percussive tool having a piston chamber and an impact piston reciprocable therein, a chamber rearwardly of said piston chamber, rotation mechanism in said second named chamber, a perforated separating member providing restricted communication between said chambers, a lubricant chamber, a continuously open passage leading from said lubricant chamber to said second named chamber for subjecting the lubricant to the fluctuating pressure in said piston chamber and for conducting lubricant to said mechanism.

6. In a percussive tool having a piston chamber and an impact piston reciprocable therein, a chamber rearwardly of said piston chamber, rotation mechanism in said second named chamber, a separating member between said chambers providing a connection therebetween under control of said mechanism, a lubricant chamber, a continuously open passage leading from said lubricant chamber to said second named chamber for subjecting the lubricant to the chamber for subjecting the lubricant in said piston chamber fluctuating pressure and for conducting lubricant to said mechanism.

7. In a percussive tool having a piston chamber and an impact piston reciprocable therein, a chamber rearwardly of said piston chamber, rotation mechanism in said second named chamber, a separating member between said chambers providing a connection therebetween under control of said mechanism, a lubricant chamber, a continuously open passage leading from said lubricant chamber to said second named chamber for subjecting the lubricant to the fluctuating pressure in said piston chamber and for conducting lubricant to said mechanism, and means at one point in said passage for restricting the flow of fluid therethrough thereby to create a time lag in the effect of the pulsations of pressure upon the lubricant.

8. A pneumatic hammer drill having a cylinder, front and back heads at the ends thereof, a working tool in said front head, a hammer piston reciprocable within said cylinder, a mechanism for rotating said tool, and means for lubricating the working parts comprising a lubricant reservoir closed save for a single passage terminating above the lubricant level and arranged for communication with the interior of said cylinder whereby the varying pressure in the piston chamber forces the lubrication against gravity through said passage in synchronism with the movement of said piston.

9. A pneumatic hammer drill having a cylinder, a cylinder ring and a back head closing one end thereof, a front head for the other end, a rotatable chuck for a working tool in said front head, a hammer piston reciprocable within said cylinder and keyed to said chuck, rifle bar rotation mechanism mounted in said back head for coaction with said piston, and means for lubricating the moving parts in synchronism with the reciprocation of said piston comprising a lubricant reservoir adjacent said front head, a passage leading from said reservoir to said back head and terminating adjacent said rotation mechanism, and a recess in said cylinder ring intermittently opened and closed by said mechanism for establishing communication between the piston chamber and said passage thereby to subject the lubricant to the varying pressure in said chamber.

10. A rock drill of the percussive type comprising a cylinder having front and back heads, a working tool rotatably mounted in the front head, a hammer piston reciprocable within the cylinder to deliver blows upon the working tool, mechanism for imparting rotation to the working tool, a lubricant reservoir adjacent said front head, a passage leading rearwardly from said reservoir and terminating adjacent said mechanism, means under control of said mechanism for establishing communication between said passage and the proximate end of the cylinder whereby the lubricant is subjected to the varying pressure behind said piston, and a plug in said passage for limiting the flow therethrough to a predetermined amount.

Signed by me at Detroit, Mich., this 6th day of November, 1923.

ERNEST PENBERTHY.

rotation to the working tool, a lubricant reservoir adjacent said front head, a passage leading rearwardly from said reservoir and terminating adjacent said mechanism, means under control of said mechanism for establishing communication between said passage and the proximate end of the cylinder whereby the lubricant is subjected to the varying pressure behind said piston, and a plug in said passage for limiting the flow therethrough to a predetermined amount.

Signed by me at Detroit, Mich., this 6th day of November, 1923.

ERNEST PENBERTHY.

CERTIFICATE OF CORRECTION.

Patent No. 1,629,730.                                    Granted May 24, 1927, to

ERNEST PENBERTHY.

It is hereby certified that error appears in the printed specification of the above numbered patent requiring correction as follows: Page 3, strike out lines 90 to 102, comprising claim 8 and insert instead the following as claim 8, "8. A pneumatic hammer drill having a cylinder, front and back heads at the ends thereof, a working tool in said front head, a hammer piston reciprocable within said cylinder, mechanism associated with said piston for imparting rotation to said tool, and means for lubricating the moving parts comprising a lubricant reservoir adjacent said front head and closed save for a single restricted passage terminating adjacent said mechanism, and means under control of said mechanism for establishing communication between said passage and the piston chamber, whereby the varying pressure in the piston chamber forces the lubricant against gravity through said passage in synchronism with the movement of said piston.";

and that the said Letters Patent should be read with this correction therein that the same may conform to the record of the case in the Patent Office.

Signed and sealed this 27th day of September, A. D. 1927.

Seal.

M. J. Moore,
Acting Commissioner of Patents.

CERTIFICATE OF CORRECTION.

Patent No. 1,629,730.                                    Granted May 24, 1927, to

ERNEST PENBERTHY.

It is hereby certified that error appears in the printed specification of the above numbered patent requiring correction as follows: Page 3, strike out lines 90 to 102, comprising claim 8 and insert instead the following as claim 8, "8. A pneumatic hammer drill having a cylinder, front and back heads at the ends thereof, a working tool in said front head, a hammer piston reciprocable within said cylinder, mechanism associated with said piston for imparting rotation to said tool, and means for lubricating the moving parts comprising a lubricant reservoir adjacent said front head and closed save for a single restricted passage terminating adjacent said mechanism, and means under control of said mechanism for establishing communication between said passage and the piston chamber, whereby the varying pressure in the piston chamber forces the lubricant against gravity through said passage in synchronism with the movement of said piston.";

and that the said Letters Patent should be read with this correction therein that the same may conform to the record of the case in the Patent Office.

Signed and sealed this 27th day of September, A. D. 1927.

Seal.                                                               M. J. Moore,
                                                       Acting Commissioner of Patents.